United States Patent
Heiman et al.

(10) Patent No.: US 10,775,613 B2
(45) Date of Patent: Sep. 15, 2020

(54) AMBIENT LIGHT BLOCKER

(71) Applicants: Arie Heiman, Sde Warburg (IL); Shraga Tsur, Tel Aviv (IL)

(72) Inventors: Arie Heiman, Sde Warburg (IL); Shraga Tsur, Tel Aviv (IL)

( * ) Notice: Subject to any disclaimer, the term of this patent is extended or adjusted under 35 U.S.C. 154(b) by 155 days.

(21) Appl. No.: 15/671,247

(22) Filed: Aug. 8, 2017

(65) Prior Publication Data
US 2018/0045954 A1    Feb. 15, 2018

Related U.S. Application Data

(60) Provisional application No. 62/374,930, filed on Aug. 15, 2016.

(51) Int. Cl.
*G02B 27/00*    (2006.01)
*G02F 1/01*    (2006.01)
*G02B 1/11*    (2015.01)
*G02B 5/00*    (2006.01)

(52) U.S. Cl.
CPC .......... *G02B 27/0018* (2013.01); *G02B 1/11* (2013.01); *G02B 5/003* (2013.01); *G02F 1/0121* (2013.01); *G02B 2207/123* (2013.01)

(58) Field of Classification Search
CPC . G02B 7/00; G02B 5/003; G02B 5/20; G02B 5/201; G02B 26/00; G02B 26/007; G02B 26/02
USPC ....... 359/237, 345, 365, 366, 376, 377, 601, 359/609, 613, 614
See application file for complete search history.

(56) References Cited

U.S. PATENT DOCUMENTS

| | | | |
|---|---|---|---|
| 2006/0209012 A1* | 9/2006 | Hagood, IV | G09G 3/3433 345/109 |
| 2010/0157408 A1* | 6/2010 | Chung | G02F 1/17 359/263 |
| 2013/0070342 A1* | 3/2013 | Wang | G02B 5/201 359/609 |
| 2013/0113732 A1* | 5/2013 | Kang | G06F 3/044 345/173 |

\* cited by examiner

*Primary Examiner* — Robert E. Tallman
(74) *Attorney, Agent, or Firm* — Reches Patent

(57) ABSTRACT

An ambient light blocker that may include an array of spatial filters of microscopic width and microscopic length; and transparent elements that are surrounded by the spatial filters of the array and are of microscopic width.

24 Claims, 14 Drawing Sheets

AMBIENT LIGHT BLOCKER

CROSS REFERENCE

This application claims priority from U.S. provisional patent Ser. No. 62/374,930, filing date Aug. 15, 2016.

BACKGROUND

Today digital and analog displays are very popular. They are used in mobile phones, smart phones, wearable devices, tablets, computers, Display of digital camera, TV, big outdoor screens, car display, etc. When a digital or analog display is used outdoors on a sunny day, it is almost impossible to see what is displayed on the screen. This is due to the glare of the sun and the ambient light and the ambient image that is reflected from the interfaces of its cover glass and mixes up with the displayed image thus, significantly lowers the contrast of the display below usability. We call it blindness of the display. As an example, in FIG. 1 and FIG. 2 we depict two typical displays of a mobile phone in outdoor on a sunny day and in indoor scenarios respectively.

This phenomenon occurs especially in mobile devices where the ambient light condition changes significantly while their display brightness is limited, such as mobile phones, tablets, wearable device, displays in cars, navigation displays, display of digital camera, big outdoor screens, etc., that are used in indoor and outdoor scenarios, day, and night.

In order to reduce the blindness effect of the display some people block the sun with their hand in order to improve the visibility of the display, but with little success. Popular Anti-Glare, matte finish screen protectors, scatter the ambient light but with little success and at the cost of the resolution of the display.

The blindness effect is due to the high intensity of the reflected and scattered ambient light from the mobile phone display compared to the intensity of the displayed signal.

SUMMARY

There may be provided an ambient light blocker that may include an array of spatial filters of microscopic width and microscopic length; and transparent elements that are surrounded by the spatial filters of the array and are of microscopic width.

The ambient light blocker may include a base and wherein the spatial filters are substantially normal to the base.

The base is formed from lower surfaces of the spatial filters and lower surfaces of the transparent elements.

The distance between spatial filters that do not contact each other and surround a certain transparent element may exceed a width of the certain transparent element.

A distance between spatial filters that contact each other and surround a certain transparent element may exceed, by at least a factor of four, a width of the certain transparent element. Any other factor may be provided.

The array of spatial filters may include non-transparent spatial filters.

The spatial filters may have an elongated cross section.

The ratio between a height of a spatial filter and a width of the spatial filter may exceed ten. Any other ratio may be provided.

The ratio between a height of a spatial filter and a width of the spatial filter may exceed five.

The spatial filters may have a rectangular cross section.

The array of spatial filters may include spatial filters that may include dark pigments.

The array of spatial filters may include spatial filters of controllable transparency.

The ambient light blocker may include a controller for controlling a transparency of the spatial filters.

The ambient light blocker may include a controller for independently controlling a transparency of different sub-arrays of the array of the spatial filters.

The ambient light blocker may include a control input; wherein the array of spatial filters may include spatial filters of controllable transparency; wherein the control input may be configured to receive signals for controlling the transparency of the spatial filters.

The ambient light blocker may include a controller and an ambient light sensor, wherein the ambient light sensor may be configured to sense ambient light and wherein the controller may be configured to control a transparency of the spatial filters based on the sensed ambient light.

The ambient light blocker may include a controller and an ambient light sensor, wherein the ambient light sensor may be configured to sense ambient light and wherein the controller may be configured to control a display intensity of a display of a device that is coupled to the ambient light blocker based on the sensed ambient light.

The array of spatial filters may include static spatial filters.

The ambient light blocker may include a controller and wherein the array of spatial filters may include movable spatial filters; wherein the controller may be configured to control a movement of the spatial filters.

The ambient light blocker may include a control input and wherein the array of spatial filters may include movable spatial filters; wherein the control input may be configured to receive signals for controlling a movement of the spatial filters.

The ambient light blocker may include an anti-reflecting coating layer.

The anti-reflecting coating layer may precede the array of spatial filters.

The anti-reflecting coating layer may be substantially normal to the array of spatial filters.

The spatial filters may be coated with anti-reflecting material.

The ambient light blocker may be integrated in a display of a device.

There may be provided a device that may include a display and an ambient light blocker, wherein the ambient light blocker may include an array of spatial filters of microscopic width and microscopic length; and transparent elements that are surrounded by the spatial filters of the array and are of microscopic width.

The ambient light blocker may be glued to the display.

The light blocker may be integrated with the display.

The device may include a controller for independently controlling a transparency of different sub-arrays of the array of the spatial filters.

The device may include a control input; wherein the array of spatial filters may include spatial filters of controllable transparency; wherein the control input may be configured to receive signals for controlling the transparency of the spatial filters.

The device may include a controller and an ambient light sensor, wherein the ambient light sensor may be configured to sense ambient light and wherein the controller may be configured to control a transparency of the spatial filters based on the sensed ambient light.

The device may include a controller and an ambient light sensor, wherein the ambient light sensor may be configured to sense ambient light and wherein the controller may be configured to control a display intensity of a display of a device that is coupled to the ambient light blocker based on the sensed ambient light.

The array of spatial filters may include static spatial filters.

The device may include a controller and wherein the array of spatial filters may include movable spatial filters; wherein the controller may be configured to control a movement of the spatial filters.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
FIG. 1 illustrates a prior art display at outdoor conditions.
Figure 2:
FIG. 2 illustrates a prior art display at indoor conditions.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

Any reference to a device or an ambient light blocker should be applied, mutatis mutandis to a method that is executed by the device or the ambient light blocker.

Any reference to method should be applied, mutatis mutandis to a device or an ambient light blocker that is configured to execute the method.

The terms "including", "comprising", "having", "consisting" and "consisting essentially of" are used in an interchangeable manner. For example—any method may include at least the steps included in the figures and/or the specification, only the steps included in the figures and/or the specification. The same applies to the device and the ambient light blocker.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

The intensity of the ambient light in indoor is around 1,000 lux and the displayed image is clear and visible.

However, the ambient light intensity in outdoor, on a sunny day, is around 100,000 lux while the typical display brightness is in the range of 300-1000 cd/m^2.

Hence, in order be able to see the display clearly, it is necessary to reduce the intensity and contrast of the reflected ambient light and by a factor of 1-2 orders of magnitude.

Figure 3:
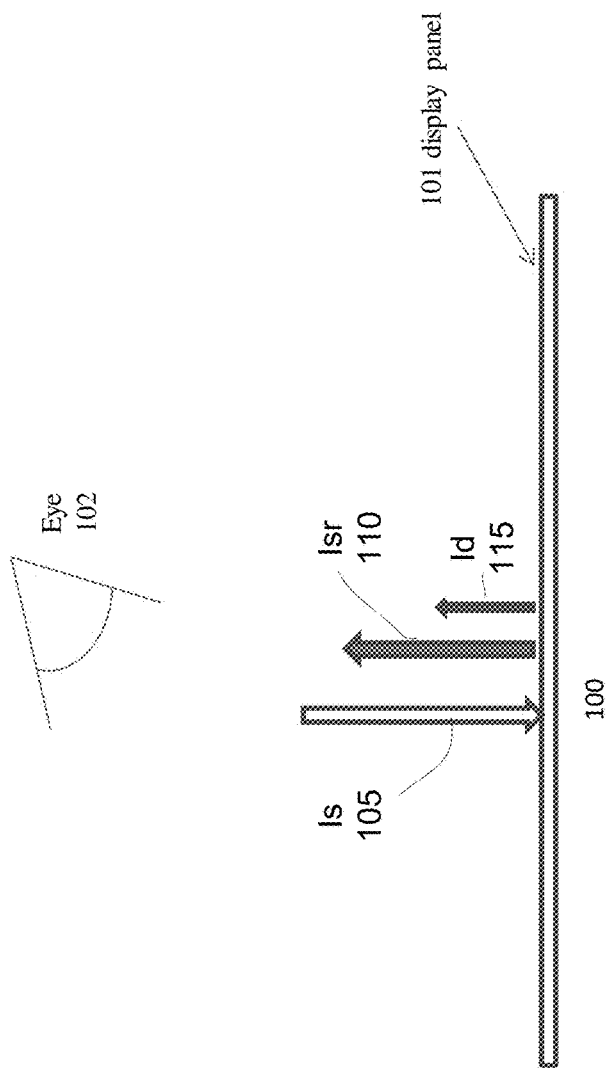
FIG. 3 illustrates prior art light beams.

FIG. 3 illustrates the impact of the ambient light 105 with intensity Is on the display panel 101.

Let us denote Isr as the intensity of the reflection ambient light 110 from the display panel.

$$Isr=Is*R$$

Where R is the reflection coefficient of the display that accumulates the reflection from all its optical interfaces.

Id is the intensity of the image 115 that is presented on the display 101.

On a sunny day Isr$\gg$Id, hence the Id signal is almost unnoticeable by the user eye 102, which effectively blocks the user eye from seeing the displayed image.

There may be provided a method and apparatus that reduces the blindness effect of the display.

To reduce the reflected ambient light intensity and ambient image contrast on sunny days there may be provided an ambient light blocker that may include an array of spatial filters, which filters the ambient light coming from directions that are not perpendicular or close to be perpendicular to the display.

The ambient light blocker may also include an ARC (Anti-Reflective Coating) that may further decrease the reduced ambient light that is perpendicular to the display.

The ambient light blocker may also include an index matching glue between the display and the cover that decreases the reflection from that interface.

The spatial filters may be arranged in any manner—an ordered grid, a non-ordered grid, and the like.

The spatial filters of the array surround transparent elements. The transparent elements may be of any shape—circle, triangle, rectangle, polygon, curved and the like.

Figure 4:
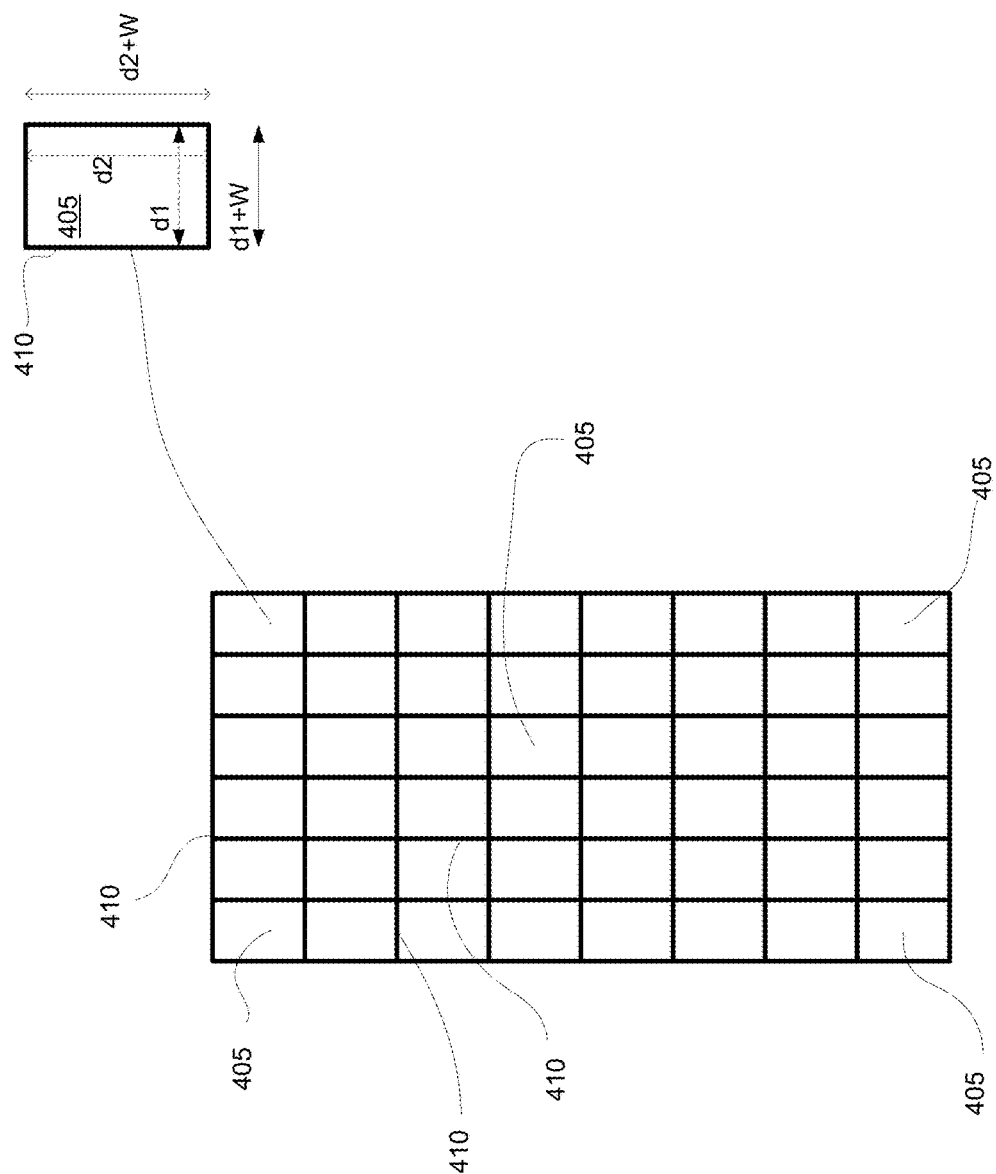
FIG. 4 illustrates an example of at least a part of an ambient light blocker.
Figure 5:
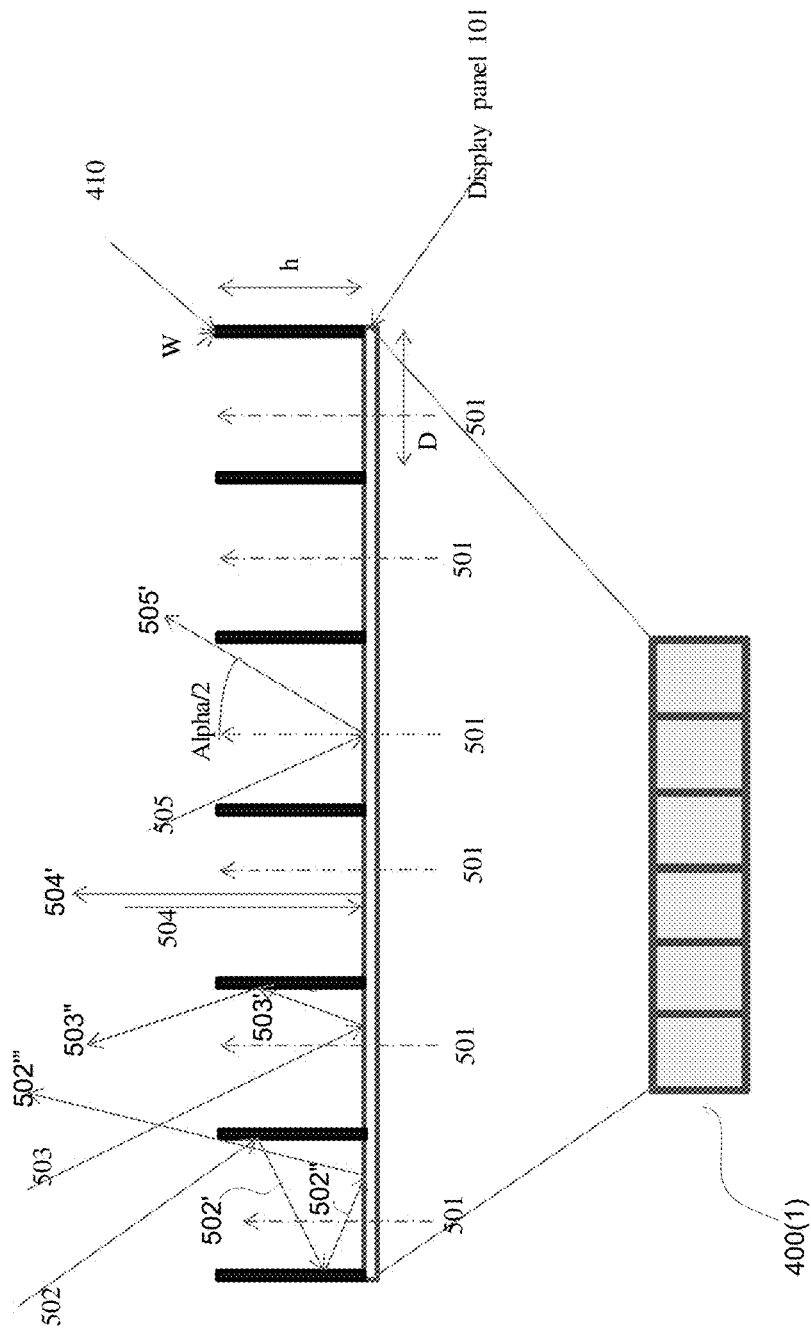
FIG. 5 illustrates an example of at least a part of an ambient light blocker.

An example for such spatial filter, there may be provided a specific layer that includes an array of rectangular filters (micro-elements), as illustrated on FIGS. 4 and 5.

It should be noted that any shape of transparent elements and/or spatial filters that can fully cover the display (or at least cover a region of interest of the display) area can be considered, such as an array of triangles, rectangles, hexagonal etc. The region of interest may be defined by a manufacturer of the ambient light blocker, by the manufacturer of the display, by a user, and the like.

FIG. 4 shows the rectangular case, wherein each transparent element is of size d1*d2 and height h.

This transparent material allows the rays that are generated in the display to penetrate via the material toward the eye of the user which enables him to see the content that is displayed.

The spatial filters are denoted 410 and are non-transparent and are used as "black" (or other non-transparent) borders between the transparent elements, that absorb the rays that are coming from the ambient light in angle>Alpha/2 (see FIG. 5) relative to the vertical to the display.

Alpha may be defined by the relationship between a height h of the spatial filters and the dimensions (width of length respectively) of the transparent part.

Typical black material can be a material that contains black pigments. Non-limiting examples of materials may include Polycarbonate, PMMA, etc.

FIG. 5 is a one-dimensional cross section of one of the rows of FIG. 4.

It should be noted that FIG. 4 presents an upper view of the array of spatial filters and transparent elements but that a combination of a transparent element and spatial filters that surround it may be a cubic element. The planes that are perpendicular to the display consist of "black" material 410 and the other material is a transparent polymer or air 405.

The size of each cubic element in the basis is (d1+W)*(d2+W), the height is h and the thickness of the black border is W. Typical values of d1, d2, W and h may be on the scale of micrometers. Non-limiting example of d1, d2, W and h are . . . d1=d2=40 μm, h=100 μm and W=15 μm. which are below the resolution of human eye. The ratios of d1, d2 and h have a significant impact on filtering of the ambient light that is not perpendicular to the display, on the other hand if h is too high or d1 and d2 are too small it might narrow the angle of view of the display.

FIG. 5 illustrates the ambient light blocking process, especially the ray 502 and 503 as an example.

Ray 502 has an intensity I2 and first impacts spatial filter 410 to provide first reflected ray 502' that is attenuated significantly by the reflection of the wall by the amount of Rw. Rw may range between . . . 0.01 and 0.1

The intensity of first reflected ray 502' is Rw*I2.

The first reflected ray 502' is reflected towards the other wall of the spatial filter—and is reflected from the wall (after being attenuated by Rw) to provide second reflected ray 502".

The intensity of second reflected ray 502" is Rw*Rw*I2.

The second reflected ray 502" is reflected from the display (after being attenuated by Rb) to provide third reflected ray 502'''.

The intensity of third reflected ray 502''' is Rb*Rw*Rw*I2.

The total attenuation of ray 502 is Rb*Rw*Rw and represents a significant reduction in intensity compared to ray 502. As both Rb and Rw are <<1 thus, the reflected ray 502''' has a residual intensity Rb*Rw^2*I2 that is much smaller than the original intensity of I2.

Ray 503 presents a different angle of impact.

Ray 503 has intensity I3 and first impacts display 101 to provide first reflected ray 503' that is attenuated significantly by Rb. Rb may range between . . . 0.02 and 0.05.

The intensity of first reflected ray 503' is Rb*I3.

The first reflected ray 503' is reflected towards the black wall of the spatial filter—and is reflected from the wall (after being attenuated by Rw) to provide second reflected ray 503".

The intensity of second reflected ray 503" is Rb*Rw*I3. I3*Rb*Rw is significantly attenuated compared to I3.

At impact angles such as in 504 and 505 the spatial filters have no affect—and the reflected rays are attenuated by the display by Rb.

Ray 410 (and rays that further deviate from the normal 501 to the display) are blocked.

It is clear that as d1 and d2 are reduced and/or h becomes higher it will increase the filtered ambient light effect. However, decreasing of d depends on W.

W is the width of the spatial filter 410, should obey W/di (i=1,2) is much smaller than one for both d1 and d2, to ensure that the intensity of light coming from the display is almost not attenuated.

The attenuation of the intensity of the display light, is the ratio between the transparent window d1*d2 to the filter dimension (d1+W)*(d2+W) hence; d1*d2/[(d1+W)*(d2+W)]=1/[1+W/d2+W/d1+(W/d1)*(W/d2)]≃1 for W/di<<1, this ensures that the intensity of the light coming from device 501 is not significantly attenuated, and the display appears to the user eye as through a transparent layer.

Figure 6:
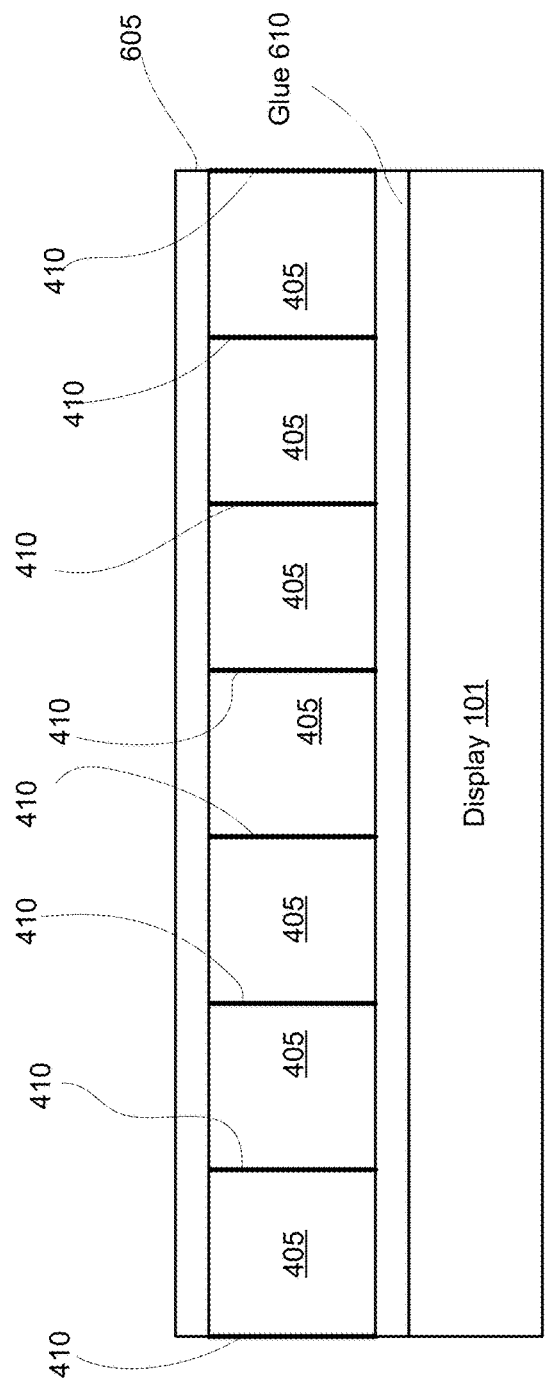
FIG. 6 illustrates an example of at least a part of an ambient light blocker.

To further reduce the intensity of the ambient light, especially the light that is perpendicular to the display, the ambient light blocker may include an upper layer (denoted 605 of FIG. 6) that is an Anti-Reflective Coating (ARC) layer, which enables to attenuate a ray that impinges at an angle that is smaller than Alpha/2 in relation to a normal to the display and is back reflected to the eye of the viewer. FIG. 6 also illustrates a glue layer 610 that is also transparent.

The glue layer may be replaced by any other base layer (such as base layer 611 of FIG. 7) that is transparent and provides support to spatial filters and/or may provide an attachment surface for attachment to display 101.

The reflectance of the display itself (Rb) may be about 4% and may be further reduced by an order of magnitude by the use of an index matching glue/gel 610. It should be noted that one can choose not to add at least one of layers 605 and 610.

The use of an ARC layer alone without the array of spatial filters may not be sufficient to suppress the glare of the ambient light and the ambient image on a sunny day, nor is the above mentioned, matte finish anti-glare.

Figure 8:
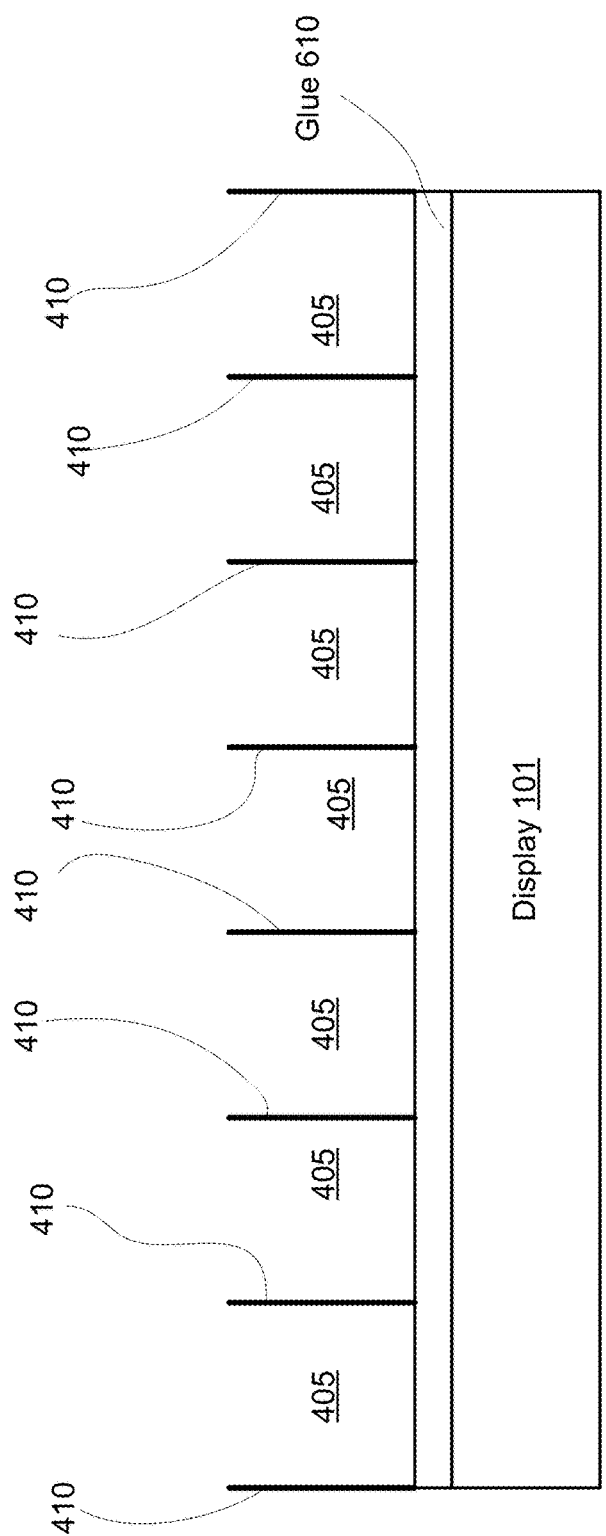
FIG. 8 illustrates an example of at least a part of an ambient light blocker.

FIG. 8 illustrates the ambient light blocker that has a glue layer 610, transparent elements 405 and spatial filters 410 but does not have the anti-reflective layer 605.

Figure 9:
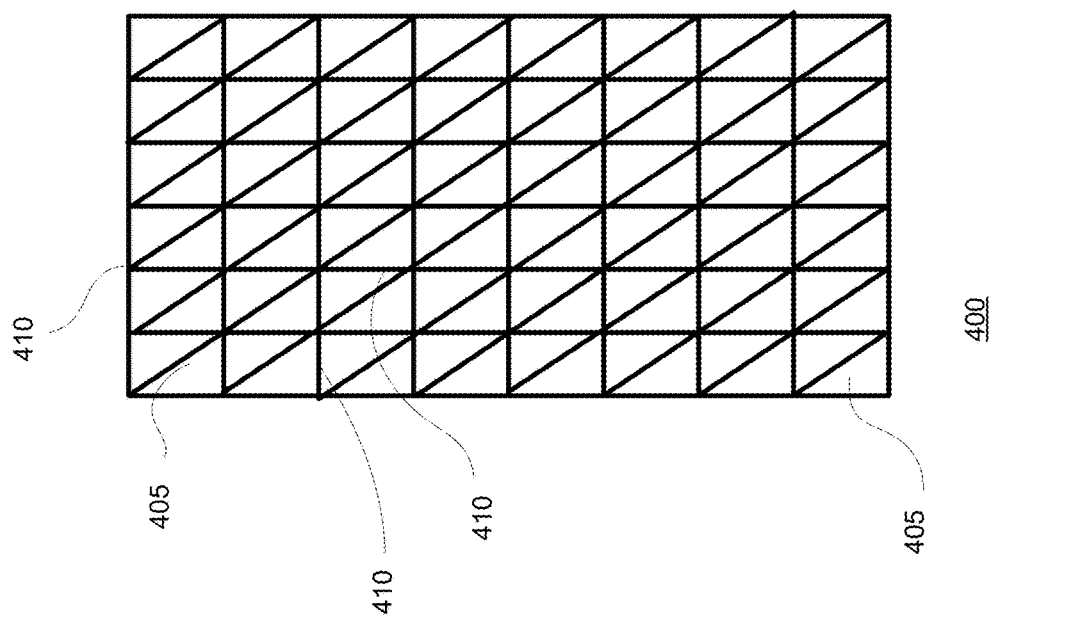
FIG. 9 illustrates an example of at least a part of an ambient light blocker.

FIG. 9 illustrates ambient light blocker 400 as including triangular shaped transparent elements 405 and has spatial filters 410.

The ambient light blocker may be integrated with the display.

The ambient light blocker may be removable attached or detachably attached to the display.

Figure 7:
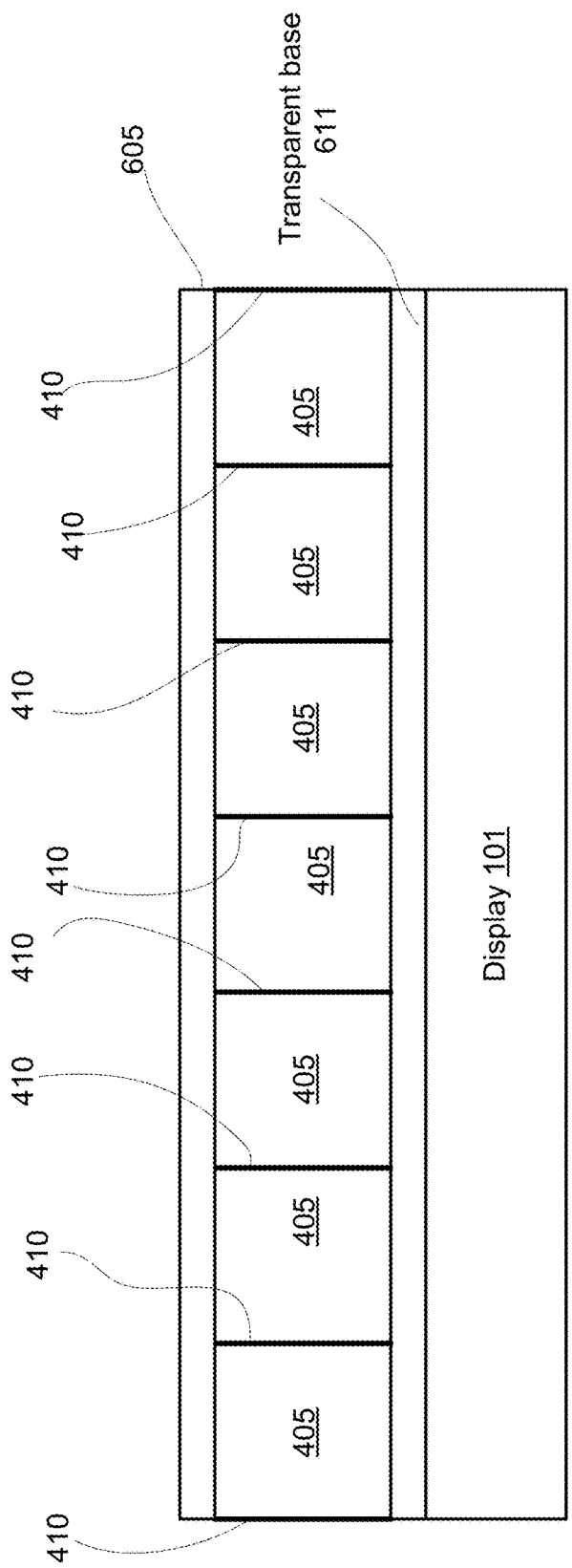
FIG. 7 illustrates an example of at least a part of an ambient light blocker.

The ambient light blocker may include a separate base (see base 611 of FIG. 7). Alternatively—the base of the ambient light blocker may be formed by the bases (lower part) of the spatial filters and/or of the transparent elements.

The ambient light blocker may be an add-on.

Referring to the array of spatial filter presented in FIG. 5—a reduction of the dimension of d1 and d2 and/or an increase of h expand the angular range of blocked ambient light rays.

The ambient light blocker may also prevent a person that is located at the side of the user of the device from viewing the display, which keeps the user privacy. However, in cases where it is important that user shares its displayed content with his friend, the spatial filter may become transparent (when the spatial filters have a controlled transparency). The transparency may be controlled by control signals such as electrical signals.

Spatial filters of controllable transparency may be liquid crystal displays. This can be controlled by the user, namely an application in the device can switch on or off the border per user request.

In cases where the user would like that in normal light condition the layer will be fully transparent, then one can use a sensor (such as a light meter) in a device that includes the display (such as a phone) to implement an ALC (Automatic Light Control) that may automatically switch off the black border and the layer become fully transparent in good light condition and if the intensity of the light is very high it automatically will switch on the border to become black borders and will filter the ambient light.

Figure 10:
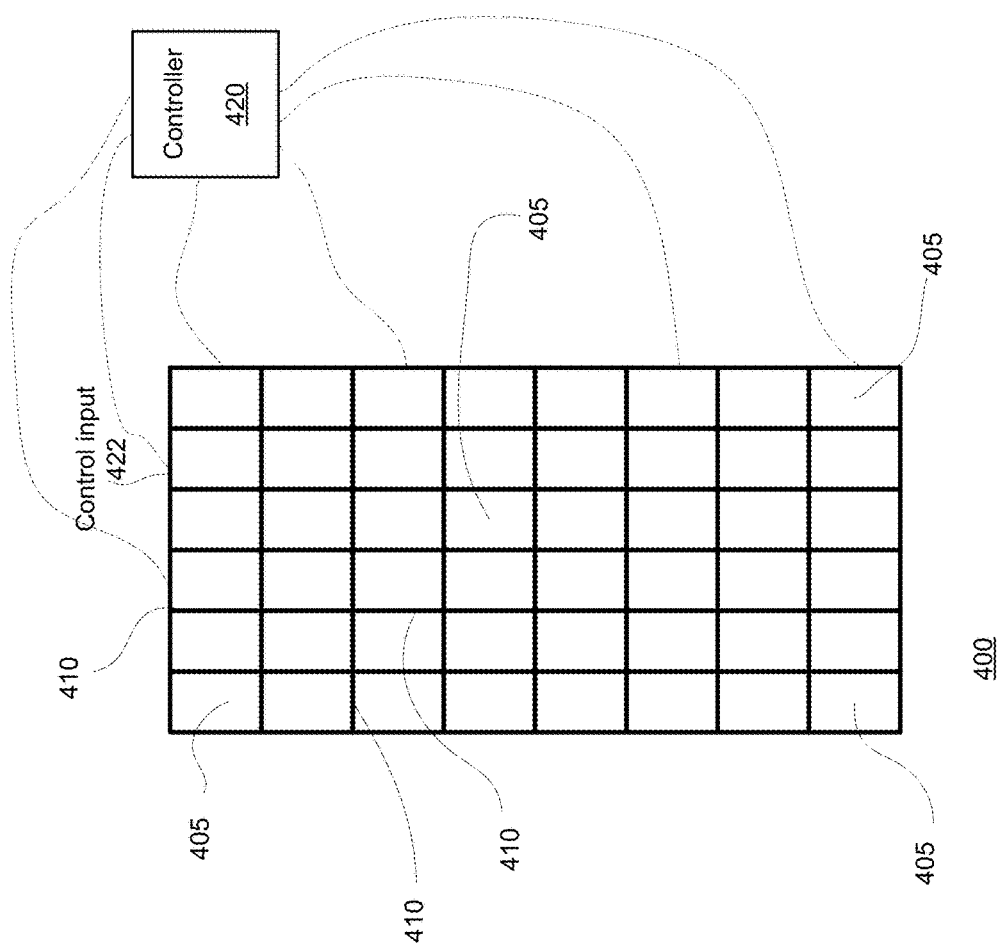
FIG. 10 illustrates an example of at least a part of an ambient light blocker and a controller.

FIG. 10 illustrates a controller 420 that may control a parameter of the ambient light blocker by sending control signals via control inputs 422. The parameter may be a transparency of the spatial filters, a position (angular deviation) of the spatial filters and the like.

The control signals may affect all the spatial filters of the array, only some of the spatial filters of the array and even only signal one spatial filter. Any combination of spatial filters may be independently controlled (for example by using different control signals) with any other combination of spatial filters. For example—different rows and/or different columns of spatial filters may be controlled independently.

Figure 11:
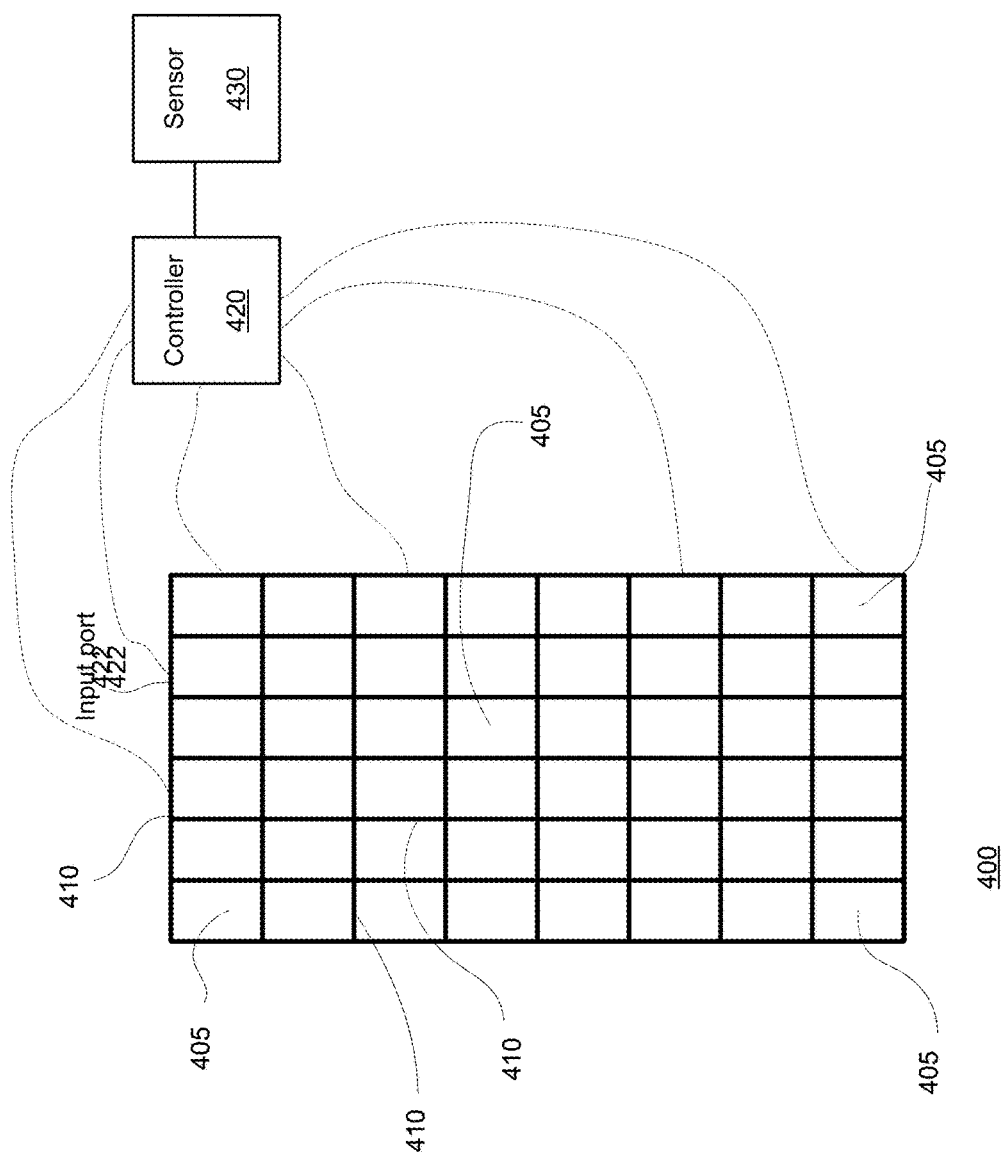
FIG. 11 illustrates an example of at least a part of an ambient light blocker, a sensor, and a controller.

FIG. 11 differs from FIG. 10 by illustrating a sensor 430 that provides detection signals to the controller 420. Controller 420 may control one or more spatial filters based on the detection signals. The detection signals from sensor 430 may reflect ambient conditions (such as intensity of ambient radiation, direction of ambient radiation, time, location, and the like. For example—the location and time may indicate whether the device is outdoors, whether the sun has shined, whether it is night time and the like.

The sensor 430 and/or the controller 420 may belong to the ambient light blocker, may belong to a kit that includes the ambient light blocker, may be included in a device that also includes the display, may be included in the display, and the like.

There may be more than one sensor of the same type and/or of different types.

Figure 12:
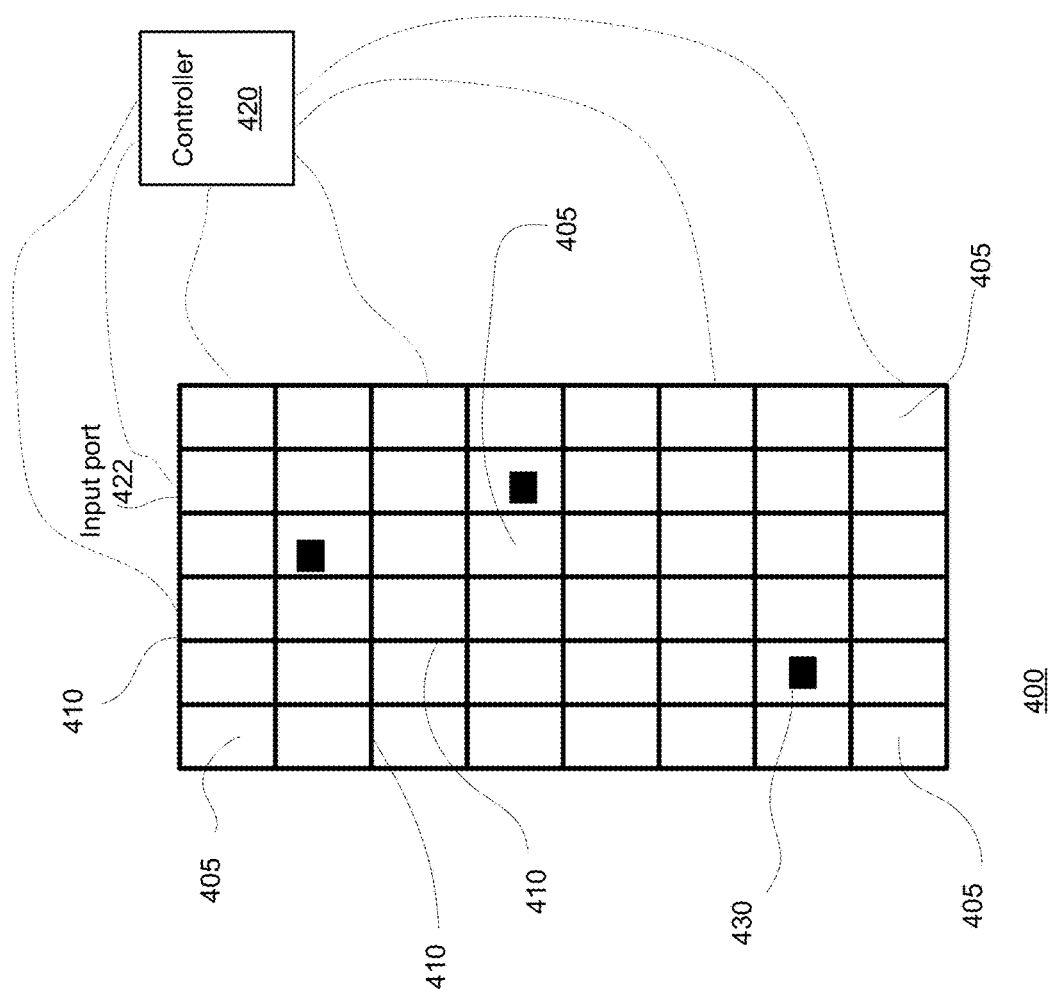
FIG. 12 illustrates an example of at least a part of an ambient light blocker, sensors, and a controller.

FIG. 12 illustrates multiple sensors 430 that may be located above, below or integrated with the ambient light blocker. These sensors may be ambient light sensors that measure light intensity at different locations of the ambient light blocker. The sensor may be coupled to controller 420 that in turn may control the ambient light blocker based on the readings of the sensors.

FIG. 12 also shows spatial filters 410 and transparent elements 405.

There may be one or more controllers for controlling one or more parts of the ambient light blocker and/or for controlling the intensity of illumination of the display.

Figure 13:
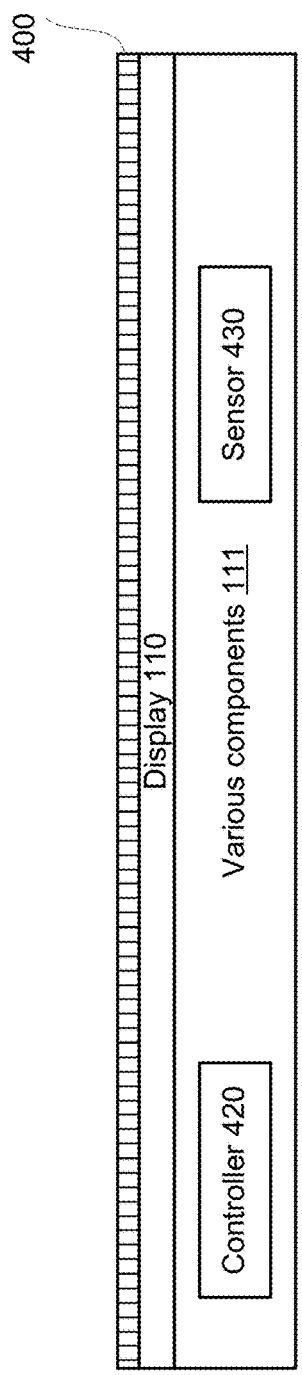
FIG. 13 illustrates an example of at least a part of a device that includes an ambient light blocker, a sensor, and a controller.

FIG. 13 illustrates a device such as a mobile phone or any computerized device—the device includes display 110, the ambient light blocker 400 and various components 111 such as controller 420 and sensor 430. Any other component required for the functionality of the device may be providing—for example microphone, speaker, processor, communication module, and the like.

Figure 14:
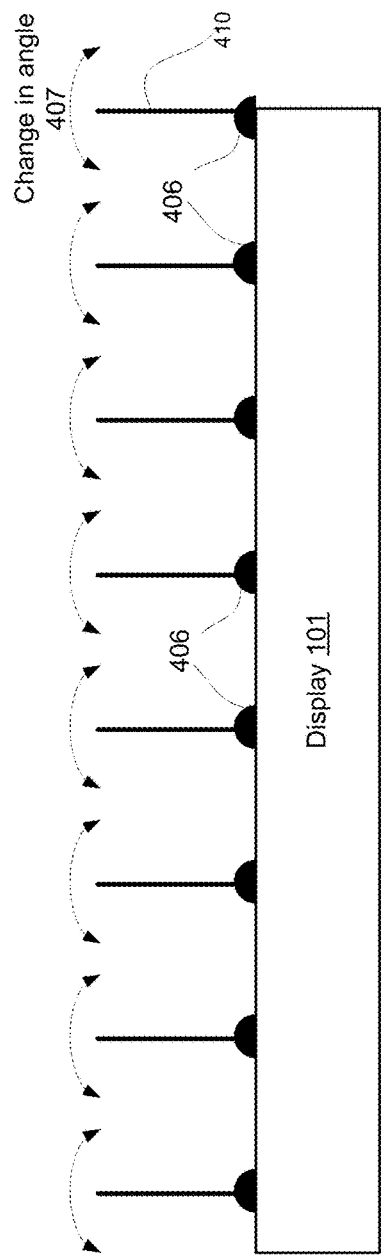
FIG. 14 illustrates an example of at least a part of an ambient light blocker, a sensor, and a controller.

FIG. 14 illustrates the ambient light blocker as including movable spatial filters 410. The spatial filters may be moved (for example—by rotation—thereby changing their orientation—407) by moving elements (for example microscopic motors 406).

It should be noted that due the fact that the spatial filters reduce the ambient light, in some cases we can decrease the display intensity and still have good visibility of the display. This fact can be used to reduce the power dissipation of the display and the amount of the heat up, which has a significant impact on the battery life of the device.

In most of the mobile phone there is a light sensor in the front of the display to measure the light intensity. With this information, the display can use auto brightness algorithm that change the display brightness according to the ambient light. If our filters cover also the light sensor, the filters will reduce the ambient light that the sensor detects and hence will reduce automatically the brightness of the display which will reduce the power consumption of the display.

There may be provided a method for operating an ambient light blocker. The ambient light blocker includes an array of spatial filters of microscopic width and microscopic length, and transparent elements such as polycarbonate or air that are surrounded by the spatial filters of the array and are of microscopic width. The spatial filters have at least one controllable parameter such as transparency and location. The method may include controlling at least one parameter of the spatial filters. The method may include receiving sensor information and/or generating sensor information and/or commands from a user or other entity—and controlling the spatial filters accordingly. For example—changing the transparency of one or more spatial filter based on a request of user, based on the intensity of ambient light, based on content displayed on the display, and the like.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. An ambient light blocker comprising:
    an array of spatial filters of microscopic width and microscopic length; wherein a longitudinal axis of each spatial filter of the array is normal to a bottom of the ambient light blocker and to a top of the ambient light blocker; and
    transparent elements that are surrounded by the spatial filters of the array and are of microscopic width; wherein the transparent elements are configured to pass radiation from a display unit; wherein the ambient light blocker is not a part of the display unit; and
    wherein the array of spatial filters and the transparent elements completely fill a space between the bottom of the upper surface and the top of the ambient light blocker.

2. The ambient light blocker according to claim 1 wherein the ambient light blocker comprises a base located at the bottom of the ambient light blocker.

3. The ambient light blocker according to claim 2 wherein the base consists of lower surfaces of the spatial filters and lower surfaces of the transparent elements.

4. The ambient light blocker according to claim 1 wherein (a) a distance between spatial filters that do not contact each other and contact a same transparent element exceeds (b) a width of the certain transparent element.

5. The ambient light blocker according to claim 1 wherein (a) a distance between spatial filters that do not contact each other and contact a same transparent element exceeds by at least a factor of four (b) a width of the certain transparent element.

6. The ambient light blocker according to claim 1 wherein the array of spatial filters comprises non-transparent spatial filters.

7. The ambient light blocker according to claim 1 wherein the spatial filters have an elongated cross section.

8. The ambient light blocker according to claim 1 wherein a ratio between a height of a spatial filter and a width of the spatial filter exceeds ten.

9. The ambient light blocker according to claim 1 wherein the spatial filters have a rectangular cross section.

10. The ambient light blocker according to claim 1 wherein the array of spatial filters comprises spatial filters that comprise dark pigments.

11. The ambient light blocker according to claim 1 wherein the array of spatial filters comprises spatial filters of controllable transparency.

12. The ambient light blocker according to claim 1 comprising a controller for controlling a transparency of the spatial filters.

13. The ambient light blocker according to claim 1 comprising a controller for independently controlling a transparency of different sub-arrays of the array of the spatial filters.

14. The ambient light blocker according to claim 1 comprising a control input; wherein the array of spatial filters comprises spatial filters of controllable transparency; wherein the control input is configured to receive signals for controlling the transparency of the spatial filters.

15. The ambient light blocker according to claim 1 comprising a controller and an ambient light sensor, wherein the ambient light sensor is configured to sense ambient light and wherein the controller is configured to control a transparency of the spatial filters based on the sensed ambient light.

16. The ambient light blocker according to claim 1 comprising a controller and an ambient light sensor, wherein the ambient light sensor is configured to sense ambient light and wherein the controller is configured to control a display intensity of a display of a device that is coupled to the ambient light blocker based on the sensed ambient light.

17. The ambient light blocker according to claim 1 wherein the array of spatial filters comprises static spatial filters.

18. The ambient light blocker according to claim 1 comprising a controller and wherein the array of spatial filters comprises movable spatial filters; wherein the controller is configured to control a movement of the spatial filters.

19. The ambient light blocker according to claim 1 comprising a control input and wherein the array of spatial filters comprises movable spatial filters; wherein the control input is configured to receive signals for controlling a movement of the spatial filters.

20. The ambient light blocker according to claim 1 comprising an anti-reflecting coating layer.

21. The ambient light blocker according to claim 20 wherein the anti-reflecting coating layer precedes the array of spatial filters.

22. The ambient light blocker according to claim 20 wherein the array of spatial filters is configured to block ambient light that impinges the ambient light blocker over a certain angular range.

23. The ambient light blocker according to claim 1 wherein the spatial filters are coated with anti-reflecting material.

24. An ambient light blocker comprising:
an array of spatial filters of microscopic width and microscopic length;
a base;
transparent elements that are surrounded by the spatial filters of the array and are of microscopic width; and
wherein each spatial filter of the array is configured to rotate in relation a contact point between the spatial filter and the base.

* * * * *